(12) United States Patent
Burka et al.

(10) Patent No.: US 9,870,317 B2
(45) Date of Patent: *Jan. 16, 2018

(54) INCREMENTAL CLASS UNLOADING IN A REGION-BASED GARBAGE COLLECTOR

(71) Applicant: International Business Machines Corporation, Armonk, NY (US)

(72) Inventors: Peter Wiebe Burka, Ottawa (CA); Jeffrey Michael Disher, Ottawa (CA); Daryl James Maier, Unionville (CA); Aleksandar Micic, Ottawa (CA); Ryan Andrew Sciampacone, Nepean (CA)

(73) Assignee: International Business Machines Corporation, Armonk, NY (US)

( * ) Notice: Subject to any disclaimer, the term of this patent is extended or adjusted under 35 U.S.C. 154(b) by 786 days.

This patent is subject to a terminal disclaimer.

(21) Appl. No.: 13/917,925

(22) Filed: Jun. 14, 2013

(65) Prior Publication Data

US 2013/0282772 A1 Oct. 24, 2013

Related U.S. Application Data

(63) Continuation of application No. 13/023,447, filed on Feb. 8, 2011, now Pat. No. 8,489,653.

(51) Int. Cl.
*G06F 17/30* (2006.01)
*G06F 12/02* (2006.01)

(52) U.S. Cl.
CPC .......... *G06F 12/0269* (2013.01); *G06F 17/30* (2013.01)

(58) Field of Classification Search
None
See application file for complete search history.

(56) References Cited

U.S. PATENT DOCUMENTS 6,185,581 B1 2/2001 Garthwaite
6,529,919 B1 3/2003 Agesen et al.
(Continued)

FOREIGN PATENT DOCUMENTS

CN 1945537 A 4/2007
JP H10320263 A1 12/1998
WO WO0161472 A2 8/2001

OTHER PUBLICATIONS

Li, Xiao-Feng, "Class Unloading Support," http://www.mail-archive.com/harmony-dev@incubator.apache.org/msg17434.html, 2006.

(Continued)

*Primary Examiner* — Jau-Shya Meng
(74) *Attorney, Agent, or Firm* — Nelson and Nelson; Daniel P. Nelson; Alexis V. Nelson

(57) ABSTRACT

A technique for incrementally unloading classes using a region-based garbage collector is described. One aspect of such a technique includes maintaining a remembered set for a class set. The remembered set indicates whether instances of the class set are contained in one or more regions in memory, and in which regions the instances are contained. Upon performing an incremental garbage collection process for a subset of the regions in memory, the technique examines the remembered set to determine whether the class set includes instances in regions outside of the subset. If the remembered set indicates that the class set includes instances outside of the subset of regions, the technique identifies the class set as "live." This will preclude unloading the class set from the subset of regions.

20 Claims, 8 Drawing Sheets

(56) References Cited

U.S. PATENT DOCUMENTS

| | | |
|---|---|---|
| 6,701,334 B1 | 3/2004 | Ye et al. |
| 7,272,695 B1 | 9/2007 | Detlefs et al. |
| 7,340,494 B1 | 3/2008 | Detlefs et al. |
| 7,499,961 B2 | 3/2009 | Detlefs |
| 2011/0264880 A1 | 10/2011 | Ylonen |

OTHER PUBLICATIONS

Ungar, David, "Generational Scavenging: A Non-Disruptive High Performance Storage Reclamation Algorithm, " PACM, 19,5, 1984.

Ungar, David, "The Design and Evaluation of a High Performance Smalltalk System," ACM Distinguished Dissertations, 1987.

Hudson, Richard, et al., "Incremental Collection of Mature Objects," Lecture Notes in Computer Science, 1992, vol. 637/1992, 388-403, DOI: 10.1007/BFb0017203.

PCT International Search Report and Written Opinion, dated Jun. 18, 2012, International Application No. PCT/CA2012/050065.

Examination Report, Application No. GB1314691.5, United Kingdom Intellectual Property Office, dated Mar. 5, 2014.

INCREMENTAL CLASS UNLOADING IN A REGION-BASED GARBAGE COLLECTOR

BACKGROUND

Field of the Invention

This invention relates to memory management, and more specifically to apparatus and methods for incrementally unloading classes using a region-based garbage collector.

Background of the Invention

In an object-oriented managed runtime, such as the Java Virtual Machine (JVM), Microsoft Common Language Runtime (CLR), or Smalltalk runtime, the primary memory resource is a garbage-collected object heap. The object heap provides memory for objects, each of which is an instance of a class. All managed runtimes support object garbage collection. Some managed runtimes, such as the Java Virtual Machine, also provide class garbage collection.

In Java, classes are collected at the granularity of the Java ClassLoader, essentially arbitrary groups of related classes designated by the programmer. A class loader may be garbage collected once there are (a) no references to the class loader, (b) no references to any of its defined classes, (c) no running methods from any defined class on any stack, and (d) no instances of any of its defined classes. Cases (a) and (b) are relatively simple to determine, since class loaders and classes both have proxy objects representing them. The usual garbage collector algorithms will find references to these "for free." Case (c) is also easy to determine, as stacks must be crawled at the beginning of each garbage collection cycle. Case (d), however, is more difficult to determine.

In a simple implementation, a garbage collector must examine every live object to determine which classes have live instances. This is simple enough to do when the collector is performing a global collection. But modern garbage collectors tend to be incremental in order to deliver superior pause times. Such collectors only examine part of the heap. These collectors typically use a "remembered set" to keep track of references from objects outside of the collection set to objects within the collection set. A naive class unloading garbage collector might use the same solution. However, this is clearly impractical. A remembered set succeeds because most objects tend to have very few references. But every object has a class pointer; remembering each of these would be impractical.

Another naive solution is to use "reference counting." This solution has several obvious drawbacks. This solution involves incrementing a counter in the class on each allocation, and decrementing it each time an object is reclaimed. Although this solution isn't prone to the typical reference counting problem of circular references, it does have two critical problems. Firstly, it doesn't parallelize well, as it requires all allocating threads to update a shared counter. Secondly, it requires that all reclaimed objects be examined, something that modern garbage collectors work hard to avoid.

Another solution for this problem is to use a train-algorithm-based collector. Such a collector is a region-based collector. However, unlike a generalized region-based collector, it is restricted in that it must collect regions in round-robin order. Due to this restriction, the train algorithm need only remember references from higher numbered to lower numbered regions. In order to enable incremental class unloading, this solution adds a "youngest train" identifier to each class, which records the lowest numbered region which has instances of the class. This simple solution is suitable for the train algorithm, but cannot be applied to nor easily generalized to a general region-based garbage collector.

In view of the foregoing, what are needed are apparatus and methods to efficiently unload classes from any subset of regions in a garbage-collected object heap. Ideally, such apparatus and methods would not require that regions be garbage collected in any particular order.

SUMMARY

The invention has been developed in response to the present state of the art and, in particular, in response to the problems and needs in the art that have not yet been fully solved by currently available apparatus and methods. Accordingly, the invention has been developed to provide apparatus and methods to incrementally unload classes using a region-based garbage collector. The features and advantages of the invention will become more fully apparent from the following description and appended claims, or may be learned by practice of the invention as set forth hereinafter.

Consistent with the foregoing, a method for incrementally unloading classes using a region-based garbage collector is disclosed herein. In one embodiment, such a method includes maintaining a remembered set for a class set, where the class set includes one of a set of classes associated with a class loader, a group of classes, and a single class. The remembered set indicates whether instances of the class set are contained in one or more regions in memory, and in which regions the instances are contained. Upon performing an incremental garbage collection process for a subset of the regions in memory, the method examines the remembered set to determine whether the class set includes instances in regions outside of the subset. If the remembered set indicates that the class set includes instances outside of the subset of regions, the method determines that the class set is "live." This will preclude unloading the class set from the subset of regions.

A corresponding computer program product and apparatus are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
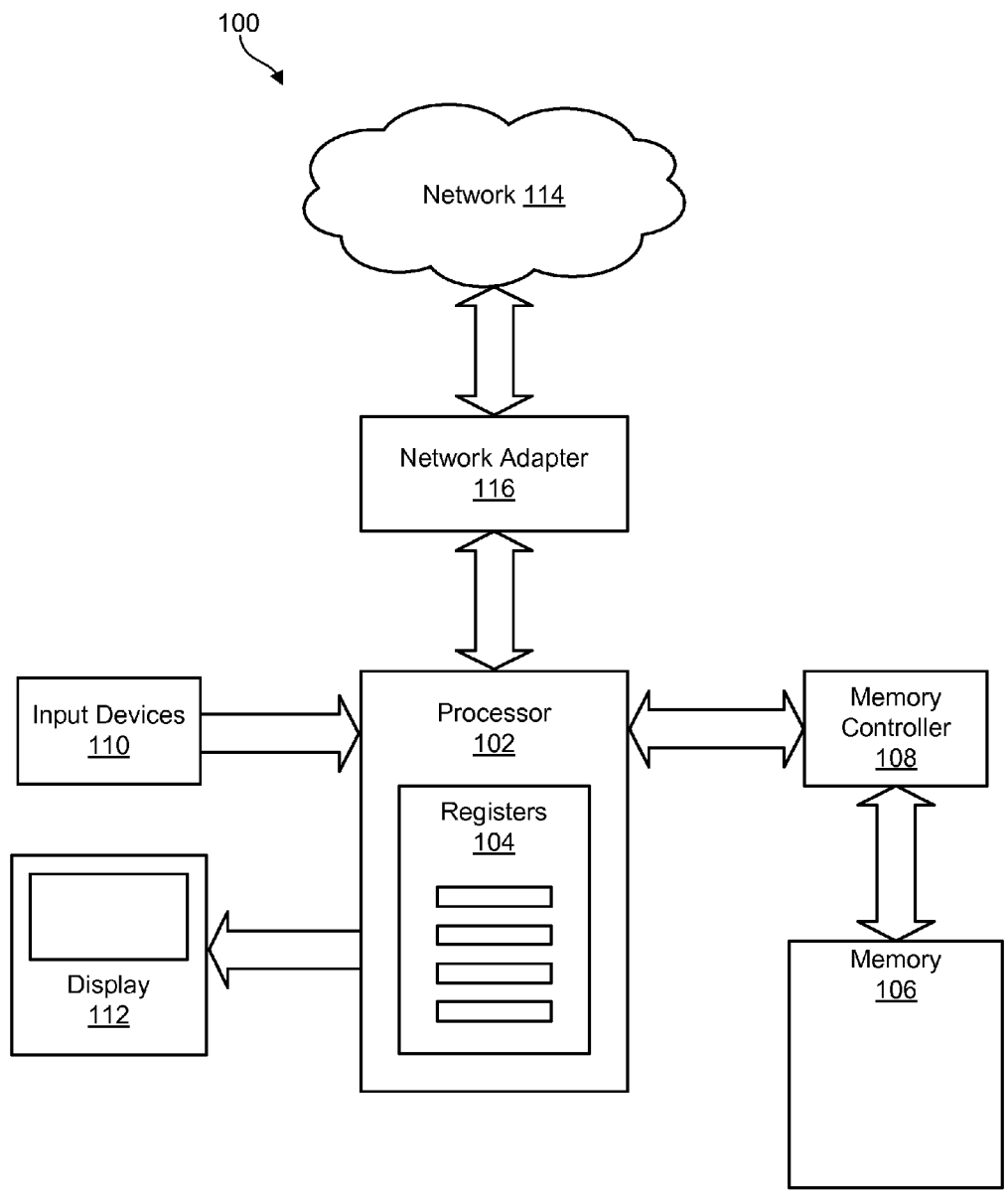
FIG. 1 is a high-level block diagram showing one example of a computer system suitable for use with various embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to various embodiments of the invention. It will be understood that each block of the flowchart illustrations and/or block diagrams, and combinations of blocks in the flowchart illustrations and/or block diagrams, may be implemented by computer program instructions or code. The computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a computer system 100 is illustrated. The computer system 100 is presented to show one example of an environment where an apparatus and method in accordance with the invention may be implemented. The computer system 100 is presented only by way of example and is not intended to be limiting. Indeed, the apparatus and methods disclosed herein may be applicable to a wide variety of different computer systems in addition to the computer system 100 shown. The apparatus and methods disclosed herein may also potentially be distributed across multiple computer systems 100.

The computer system 100 includes at least one processor 102 and may include more than one processor. The processor 102 includes one or more registers 104 storing data describing the state of the processor 102 and facilitating execution of software systems. The registers 104 may be internal to the processor 102 or may be stored in a memory 106. The memory 106 stores operational and executable data that is operated upon by the processor 102. The memory 106 may be accessed by the processor 102 by means of a memory controller 108. The memory 106 may include volatile memory (e.g., RAM) as well as non-volatile memory (e.g., ROM, EPROM, EEPROM, hard disks, flash memory, etc.).

The processor 102 may be coupled to additional devices supporting execution of software and interaction with users. For example, the processor 102 may be coupled to one or more input devices 110, such as a mouse, keyboard, touch screen, microphone, or the like. The processor 102 may also be coupled to one or more output devices such as a display device 112, speaker, or the like. The processor 102 may communicate with one or more other computer systems by means of a network 114, such as a LAN, WAN, or the Internet. Communication over the network 114 may be facilitated by a network adapter 116.

Figure 2:
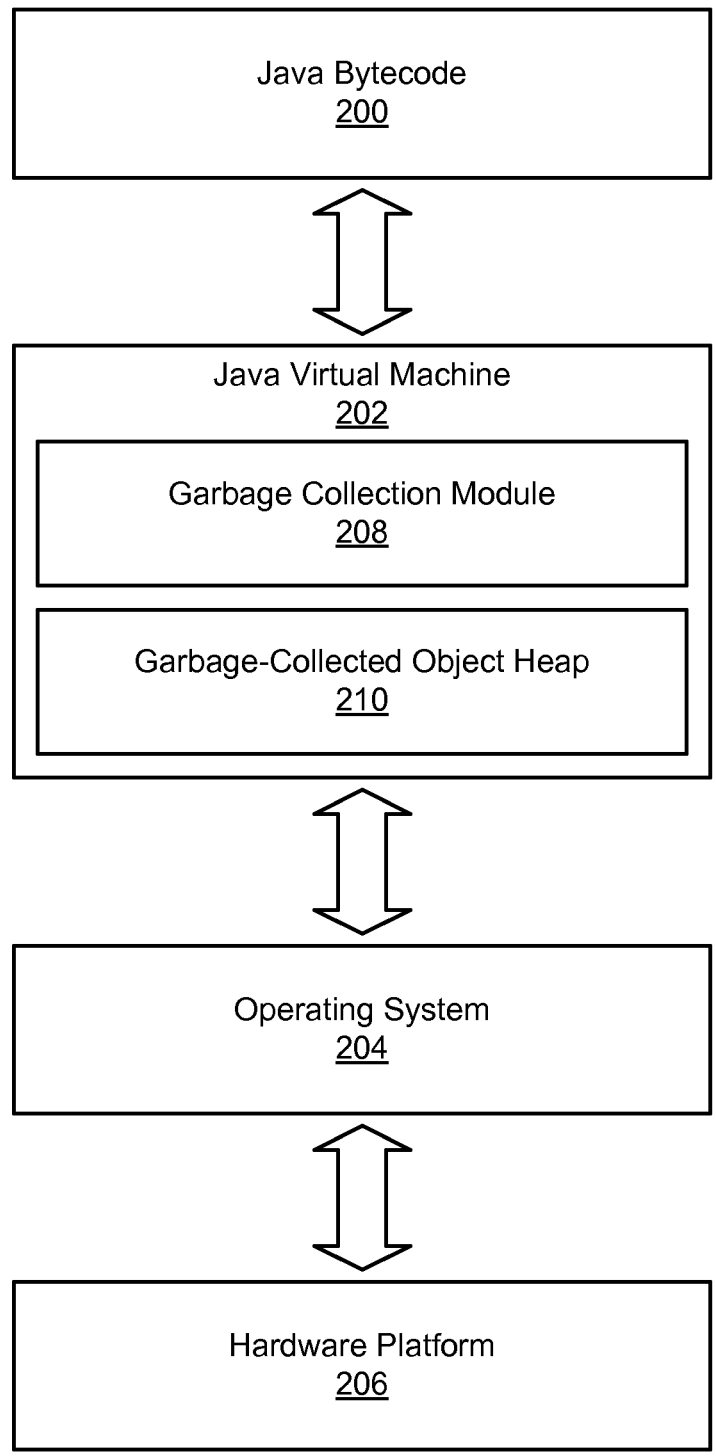
FIG. 2 is a high-level block diagram showing one example of an object-oriented managed runtime, in this example the Java Virtual Machine.

Referring to FIG. 2, one example of an object-oriented managed runtime, in this example the Java Runtime Environment, is illustrated. The Java Runtime Environment is presented to show one example of a runtime environment in which various embodiments of the invention may operate.

Nevertheless, the incremental garbage collection techniques disclosed herein are not limited to the Java Runtime Environment but may operate or be adapted to operate in any object-oriented managed runtime that uses a garbage-collected object heap to store objects. Other non-limiting examples of runtime environments in which embodiments of the invention may operate include the Microsoft Common Language Runtime (CLR) and Smalltalk runtime. Thus, although particular reference is made herein to the Java Runtime Environment, the principles taught herein are not limited to the Java Runtime Environment but may be applicable to many runtime environments.

As shown in FIG. 2, in the Java Runtime Environment, a Java Virtual Machine 202 may be configured to operate on a specific platform, which may include an underlying hardware and operating system architecture 204, 206. As shown, the Java Virtual Machine 202 receives program code 200, compiled to an intermediate form referred to as "bytecode" 200. The Java Virtual Machine 202 translates this bytecode 200 into native operating system calls and machine instructions for execution on the underlying platform 204, 206. Instead of compiling the bytecode 200 for the specific hardware and software platform 204, 206, the bytecode 200 is compiled once to operate on all Java Virtual Machines 202. A Java Virtual Machine 202, by contrast, may be tailored to the underlying hardware and software platform 204, 206. In this way, the Java bytecode 200 may be considered platform independent.

As previously mentioned, in the Java Runtime Environment, the primary memory resource is a garbage-collected object heap 210. The object heap 210 provides memory for objects, each of which is an instance of a class. A garbage collection module 208, or subsystem 208, is provided in the Java Runtime Environment to reclaim memory occupied by objects, or classes associated with objects, that are no longer in use by a program. Among other benefits, the garbage collection module 208 frees a programmer from worrying about releasing objects that are no longer needed, which would otherwise require significant design effort from the programmer.

As previously mentioned, in Java, classes are unloaded at the granularity of class loaders, which are essentially arbitrary groups of related classes designated by a programmer. A class loader may be unloaded once there are (a) no references to the class loader, (b) no references to any of its defined classes, (c) no running methods from any defined class on any stack, and (d) no instances of any of its defined classes. The garbage collection module 208 may easily determine cases (a) and (b) since class loaders and classes both have proxy objects representing them. The garbage collection module 208 can also easily determine case (c), as stacks must be crawled at the beginning of each garbage collection cycle. However, the garbage collection module 208 may have greater difficulty determining case (d). Various novel techniques for efficiently determining case (d) will be described in association with FIGS. 3 through 8.

In order to reduce pause times, the garbage collection module 208 may be configured to operate in an incremental manner. That is, the garbage collection module 208 may be configured to perform garbage collection on a portion of the object heap 210 at a time, as opposed to the entire object heap 210. In order to accomplish this, the object heap 210 may be divided into a number of regions (e.g., hundreds or thousands of regions). The garbage collection module 208 may then perform garbage collection on a subset of these regions (also referred to herein as the "collection set") at any particular time. This minimizes, as much as possible, the disruption of the main program. Because the garbage collection module 208 may operate in an incremental manner, the garbage collection module 208 needs to be able to determine which class loaders have live objects inside and outside the collection set to determine whether the class loaders can be unloaded. Various techniques for determining whether a class loader has live objects inside or outside of a collection set are discussed in association with FIGS. 3 through 8.

Figure 3:
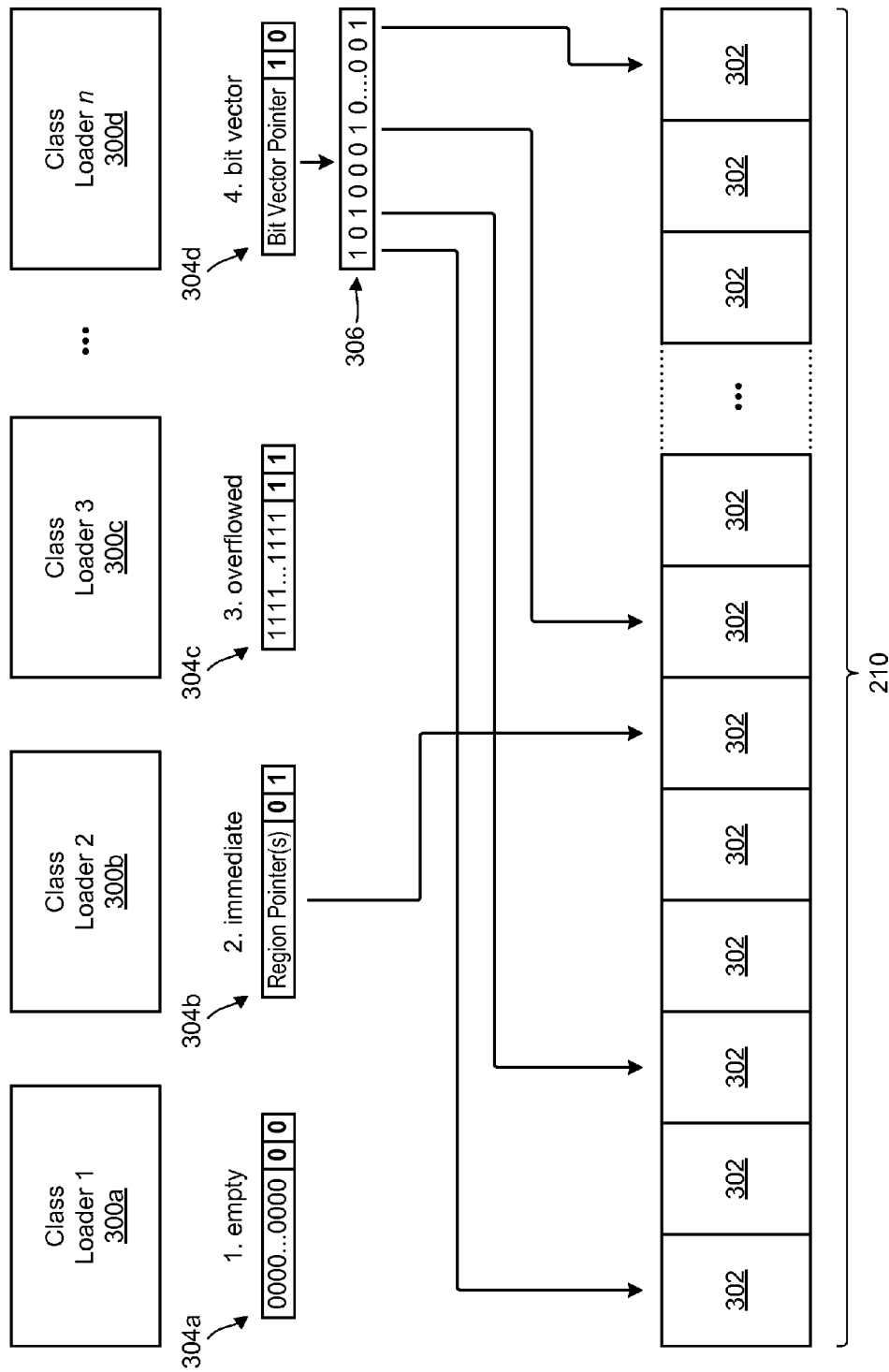
FIG. 3 shows one embodiment of the invention where a remembered set, in this example a remembered set field and optional bit vector, is maintained for each class loader in a runtime environment.

Referring to FIG. 3, in certain embodiments in accordance with the invention, a remembered set may be provided for each class set in a runtime environment. In this disclosure, a "class set" is used to refer to a set of classes associated with a class loader, a group of classes, a single class, or the like. While Java may unload classes at the granularity of a class loader, other runtime environments may unload classes at other levels of granularity, such as individual classes or groups of classes. The phrase "class set" is intended to encompass these different levels of granularity.

FIG. 3 shows an embodiment where the class set is a set of classes associated with a class loader 300. In this embodiment, a remembered set 304 is associated with each class loader 300 in the runtime environment. The remembered set 304 is used to remember whether any class associated with the class loader 300 includes instances in any region 302 of the object heap 210. The remembered set 304 may also indicate the regions 302 in which the instances are located.

As shown in FIG. 3, in selected embodiments, a remembered set 304 may be embodied as a field 304, in this example a tagged pointer 304. In certain embodiments, such a field 304 may be added to the internal structure of a class loader 300. For example, in the Java Runtime Environment, the field 304 may be added to the internal ClassLoader structure. This field 304 may be used by the garbage collection module 208 to build a remembered set 304 of regions 302 that contain instances of classes defined by the class loader 300.

In order to use memory efficiently, the fields 304 may, in certain embodiments, use one of the representations illustrated in FIG. 3. These representations include: (1) the "empty" representation 304a—this representation indicates that no instances of the class set are contained in any of the regions 302 in memory 210; (2) the "immediate" representation 304b—this representation stores one or more pointers that point to regions 302 in memory 210 that contain instances of the class set; (3) the "overflow" representation 304c—this representation is an error state that assumes that all regions 302 contain instances of the class set, even if this is not actually the case; and (4) the "bit vector" representation 304d—this representation stores a pointer to a bit vector 306 having one bit per region 302, wherein setting a bit in the bit vector 306 indicates that at least one instance of the class set is contained in the corresponding region 302. In the illustrated embodiment, the two bits at the end of each field 304 provide a "tag" to indicate which representation is used. For example, as shown in FIG. 3, the "00" tag indicates that the field 304 is using the "empty" representation 304a; the "01" tag indicates that the field 304 is using the "immediate" representation 304b; the "11" tag indicates that the field 304 is using the "overflow" representation 304c, and the "10" tag indicates that the field 304 is using the "bit vector" representation 304d.

Figure 4:
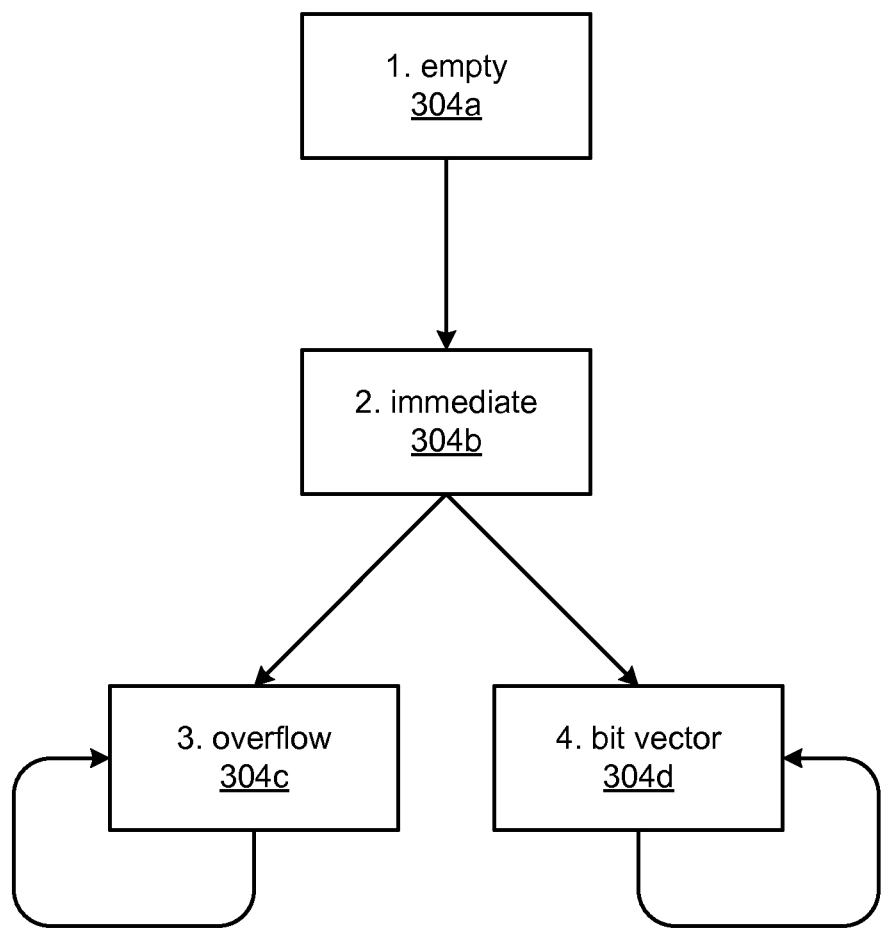
FIG. 4 is a flow diagram showing an example of transitions between representations of the remembered set field.

Referring to FIG. 4, while continuing to refer generally to FIG. 3, when a class set (e.g., a class loader) is loaded onto the object heap 210, the field 304 associated with the class set may initially start in the empty representation 304a. The empty representation 304a may be equivalent to a bit vector 306 with no bits set. The field 304 may then transition to the immediate representation 304b when an instance of the class set is introduced into a region 302. The immediate representation 304b may be treated as equivalent to a bit vector 306 with only the bits for the instance-containing regions set. As previously mentioned, the immediate representation 304b may allocate memory for a small number of pointers to point to regions 302 where instances of the class set are stored. This avoids the cost of allocating an entire bit vector 306 where instances of the class set are only contained in a small number of regions 302. For example, Singleton class loaders (class loaders associated with a single class, which only includes a single instance) are commonly used in Java—the standard java.lang.reflect package makes extensive use of them. The ability to point to a single region 302, or a small number of regions 302, can provide significant savings compared to allocating an entire bit vector 306. In certain embodiments, the immediate representation 304b may be extended to identify a small number of regions 302 by index.

Once a number of regions 302 that contain instances of a class set exceed the number of pointers that can be stored by the immediate representation 304b, the field 304 may transition to the bit vector representation 304d. Upon transitioning to this representation 304d, a bit vector 306 is allocated to the class set. As previously mentioned, this bit vector 306 may include a bit for each region 302 in the object heap 210. Setting a bit indicates that at least one instance of a class associated with the class set is stored in the corresponding region 302.

In certain embodiments, the garbage collection module 208 may limit the amount of memory that is used by bit vectors 306. If the garbage collection module 208 is unable to allocate a bit vector 306, either because the memory limit has been reached or the system is out of memory, the garbage collection module 208 may set the state of the field 304 to the overflow representation 304c. The overflow representation 304c may be treated as equivalent to a bit vector 306 with every bit set, except that, unlike a bit vector 306, bits cannot be cleared from the overflow representation 304c. Once a field 304 uses the overflow representation 304c, it may stay in the overflow representation 304c until the corresponding class set is unloaded from the object heap 210. Similarly, once a field 304 uses the bit vector representation 304d, it may stay in the bit vector representation 304d until the corresponding class set is unloaded from the object heap 210.

Figure 5:
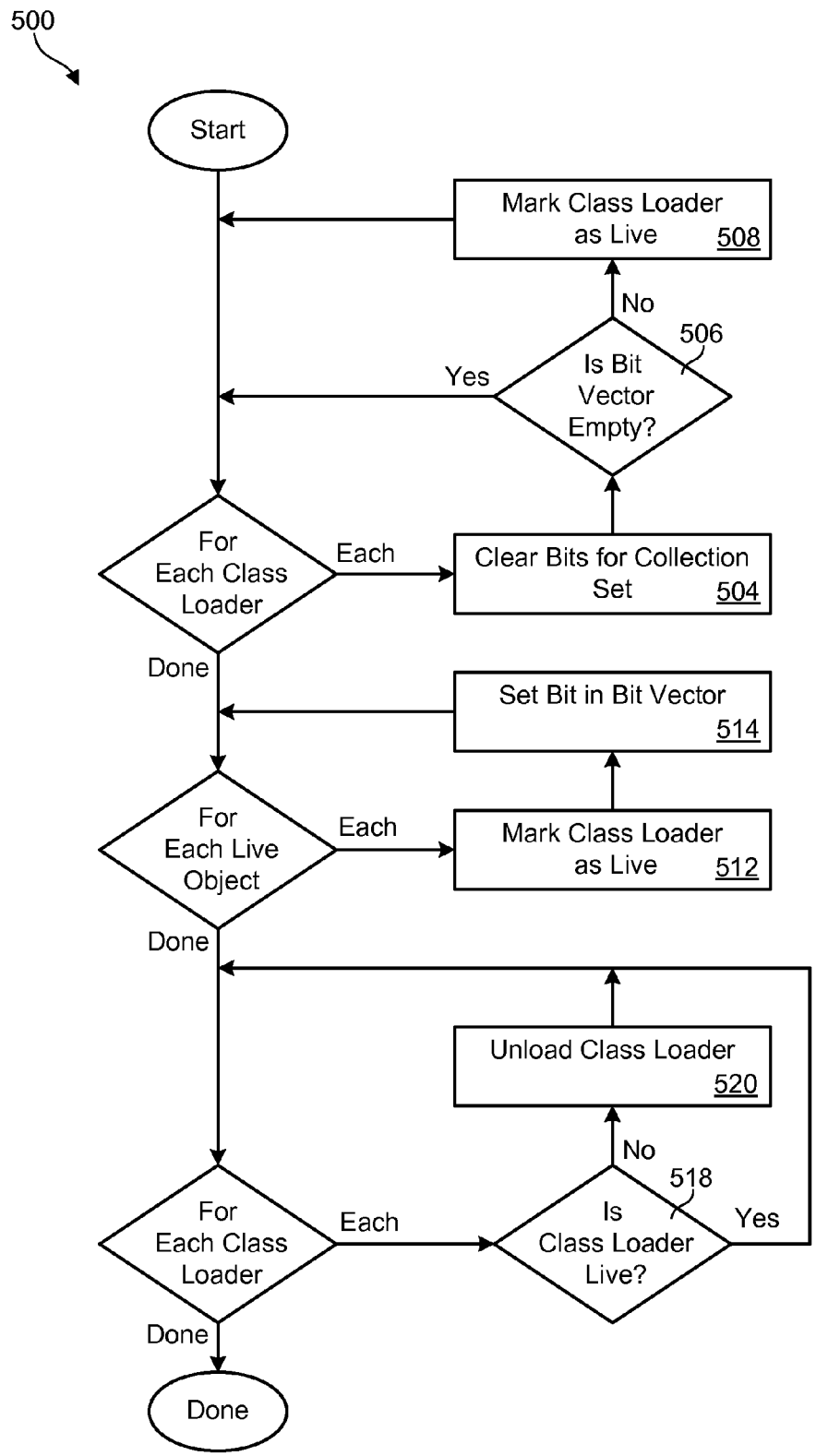
FIG. 5 is a flow diagram showing one embodiment of a method for unloading class loaders from an object heap.

Referring to FIG. 5, one embodiment of a method 500 for unloading class sets, and more specifically class loaders 300, from an object heap 210 during an incremental garbage collection process is illustrated. The method 500 assumes that each class loader 300 includes its own bit vector 306, although the method 500 could be easily adapted to handle all four representations 304a-d described in FIGS. 3 and 4. As shown, for each class loader 300 in the collection set, the method 500 clears 504 the bits in the bit vector 306 for the regions 302 that are in the collection set. If, after clearing the bits, the method 500 determines 506 that the bit vector 306 is empty, then the class loader 300 is a candidate for unloading from the collection set. If, on the other hand, the method 500 determines 506 that the bit vector 306 is not empty (at least one bit is set), then the class loader 300 is not a candidate for unloading from the collection set since it may contain at least one instance in a region outside of the collection set. In such a case, the method 500 marks 508 the class loader 300 as "live."

During the incremental garbage collection process, live objects will be discovered in the collection set. For each live object discovered, the method 500 determines the class loader that is associated with the live object as well as the region in which the live object is contained. The method 500 marks 512 the class loader 300 associated with the live object as "live" and sets 514 the bit in the class loader's bit vector 306 for the region in which the live object resides.

At the end of the incremental garbage collection process, the method 500 once again examines the class loaders 300 in the collection set. For each class loader 300 in the collection set, the method 500 determines 518 whether the class loader 300 is marked as "live." If the class loader 300 is not marked as "live," it can be inferred that the class loader 300 is dead (unreachable) and that no instances of any classes associated with the class loader 300 reside either inside or outside of the collection set. In such a case, the method 500 unloads 520 the class loader 300 from the collection set. Otherwise, the method 500 leaves the class loader 300 in the collection set.

Figure 6:
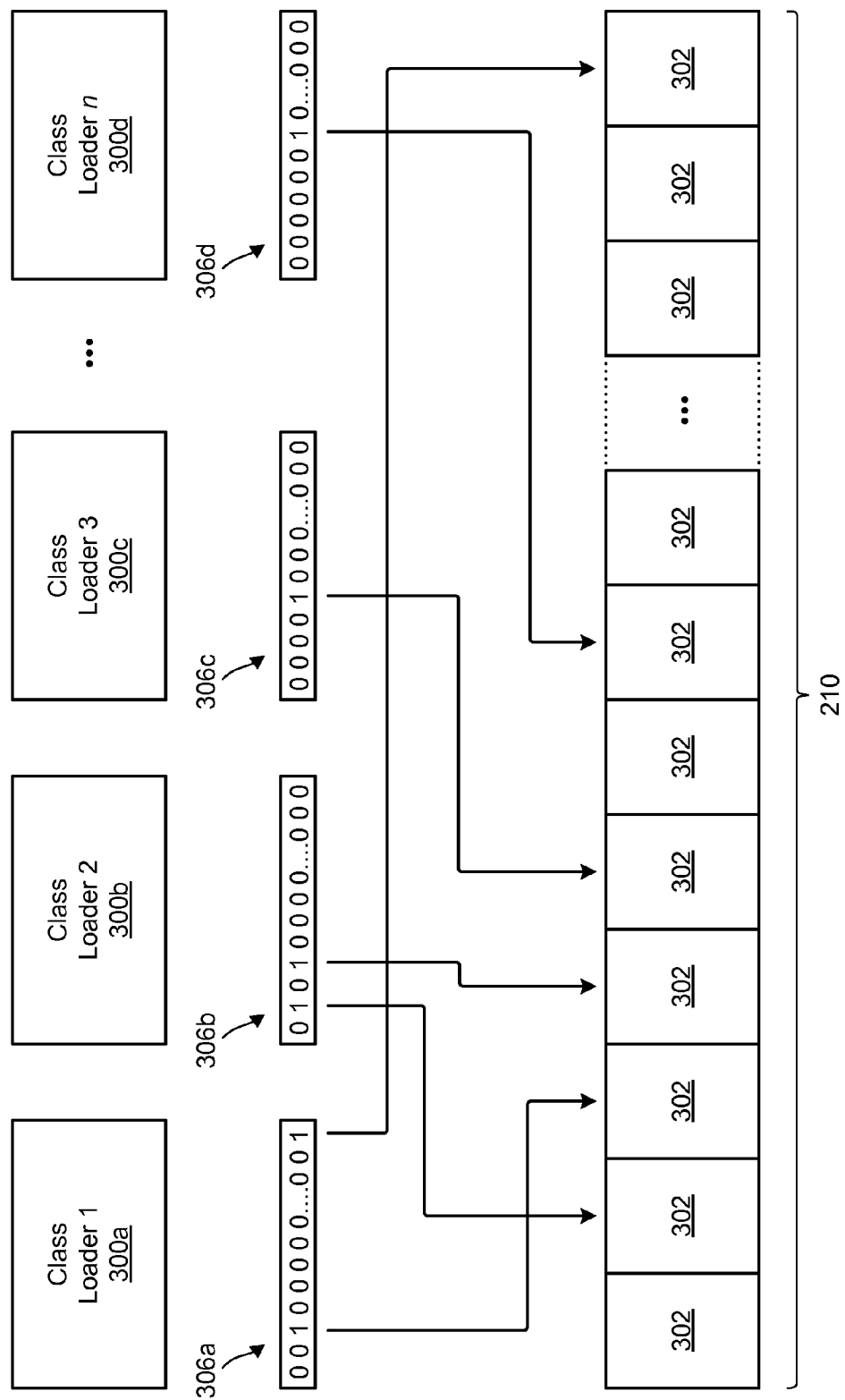
FIG. 6 shows an alternative embodiment of the invention in which a bit vector is maintained for each class loader.

Referring to FIG. 6, different variations of the above-described incremental garbage collection process are possible and within the scope of the invention. For example, instead of implementing the remembered set using the four representations 304a-d described in association with FIGS. 3 and 4, a bit vector 306 may be allocated for each class set, such as each class loader 300. Although this embodiment may not use memory as efficiently as the four representations 304a-d previously described, especially where a significant number of class loaders 300 are Singleton class loaders or in cases where class loaders 300 define a small number of classes or have a small number of instances of those classes on the object heap 210, it may have advantages in terms of simplicity. It may also be efficient in cases where there are a relatively small number of regions 302 in the object heap 210, since this will reduce the number of bits in each bit vector 300 and thus the amount of memory utilized by each bit vector 300.

Figure 7:
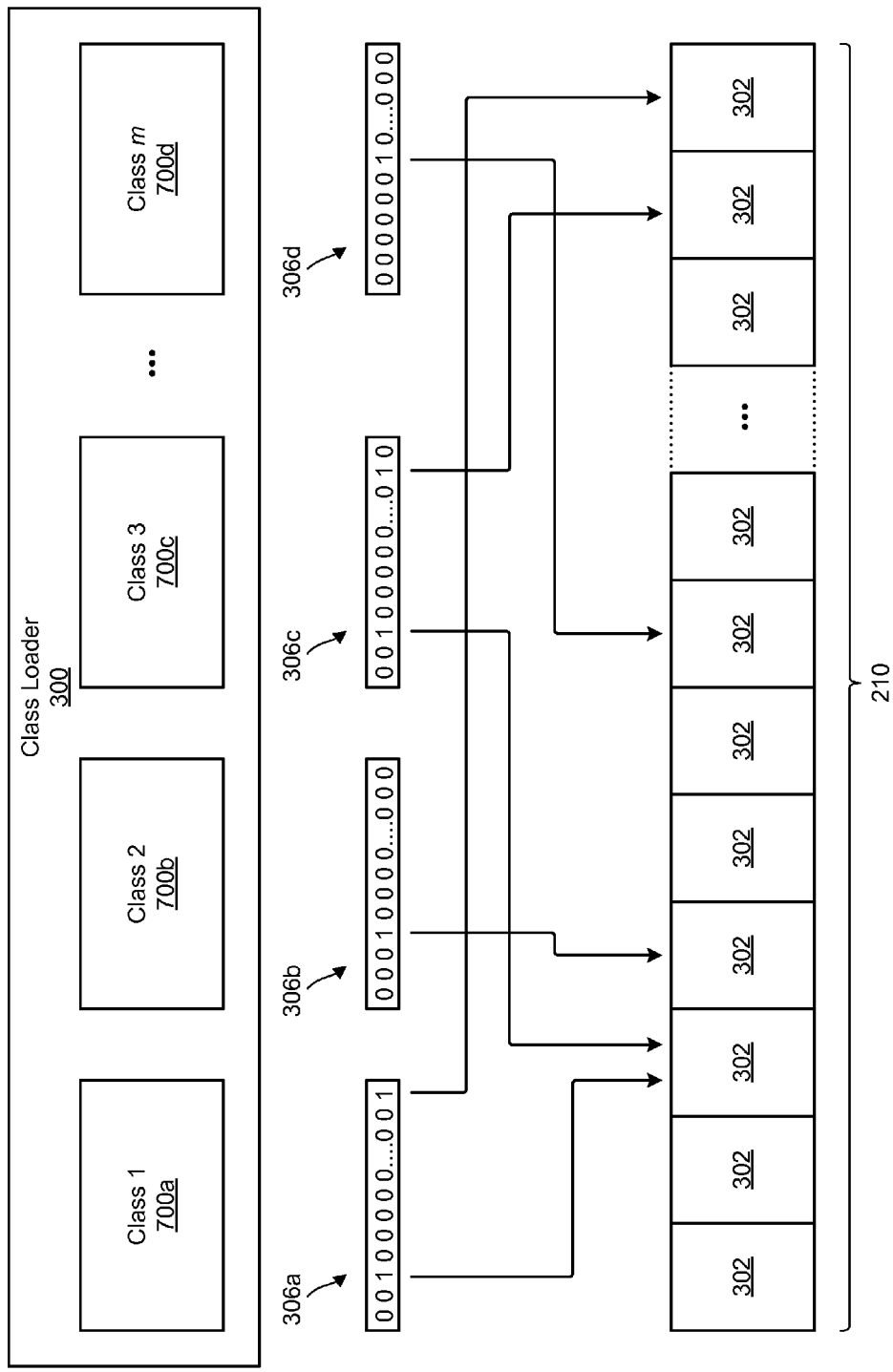
FIG. 7 shows an alternative embodiment of the invention in which a bit vector is maintained for each class.

Referring to FIG. 7, in another embodiment, instead of providing a bit vector 306 for each class loader 300, a bit vector 306 may be provided for each class 700. When a class is contained in a region 302, the bit associated with the region 302 may be set. During the incremental garbage collection process, the bit vectors 306 may be examined to determine whether instances of classes 700 in the collection set are contained in regions 302 inside or outside of the collection set. If a class 700 is determined to be dead using its bit vector 306, the class 700 may be unloaded from the collection set. Alternatively, the process may wait until all classes 700 associated with a class loader 300 or other group of classes are dead before unloading any of the classes 700 from the collection set. When all classes 700 are dead, the classes 700 may be unloaded as a group. This embodiment could also be modified to use any of the representations 304a-d described in FIGS. 3 and 4 for individual classes 700.

Figure 8:
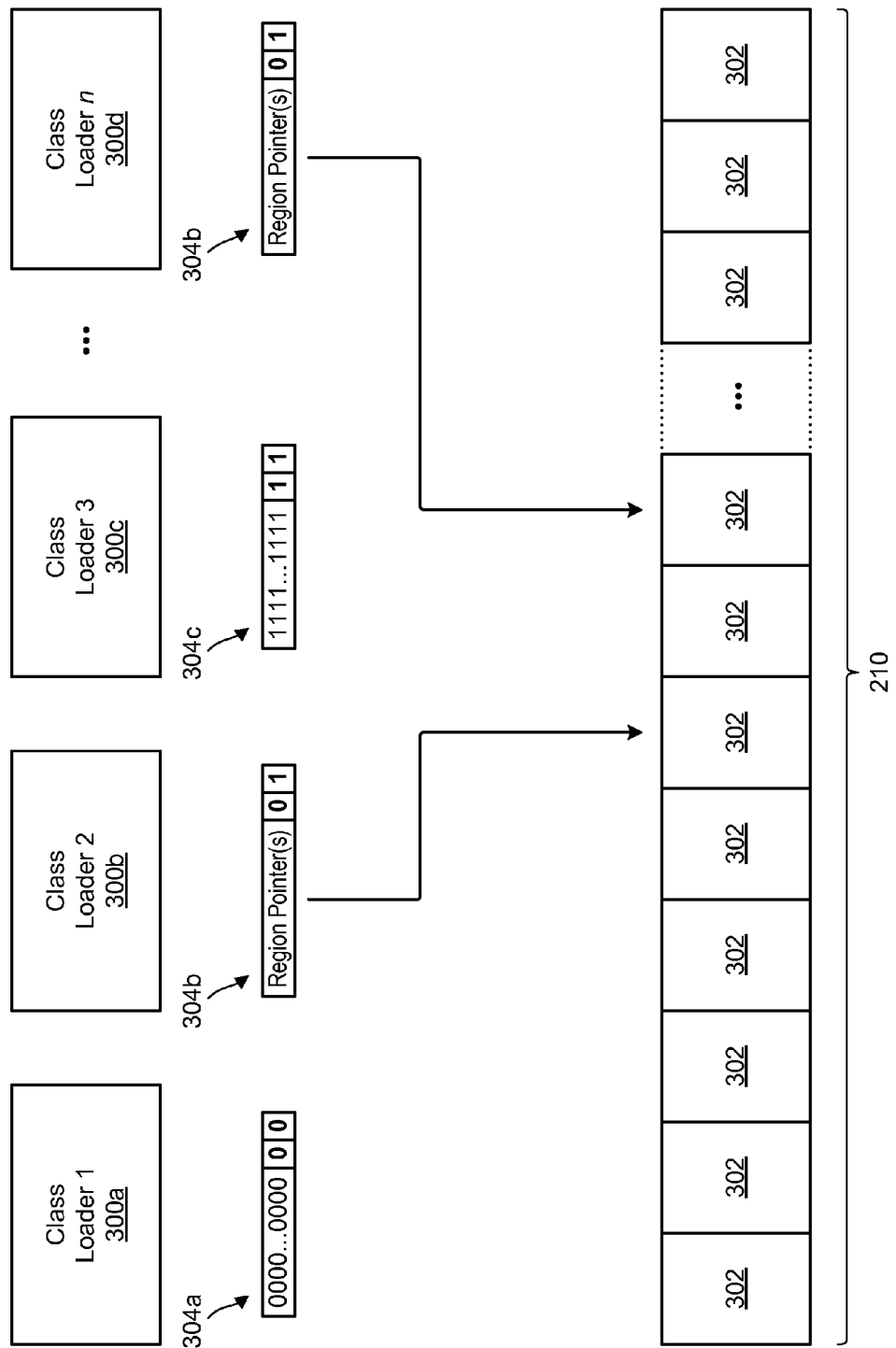
FIG. 8 shows an alternative embodiment of the invention in which a remembered set field is maintained for each class loader, without using a bit vector.

Referring to FIG. 8, in yet another embodiment of the invention, the first three representations 304a-c may be used while omitting any representation 304d utilizing a bit vector 306. In such an embodiment, the "immediate" representation 304b may be configured to store a specific number of pointers to identify a selected number of regions 302, up to some limit. When the limit is reached, the overflow representation 304c, which assumes that an instance of a class associated with a class set is contained in all regions 302, may be used. When a class set uses the overflow representation 304c, the class set may stay in the overflow representation 304c until a global garbage collection is performed and the class set is unloaded. This embodiment may utilize memory in an efficient manner, except in cases where many class sets include instances in regions exceeding the number of pointers available in the immediate representation 304b. This would cause many class sets to use the overflow representation 304c, which may be inefficient.

The embodiments illustrated in FIGS. 3, 6, 7, and 8 are simply examples of different techniques to implement a remembered set 304. Each may have advantages and disadvantages in different runtime environments. The embodiments are presented only by way of example and are not intended to be limiting. Thus, other variations are possible and within the scope of the invention.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in a block may occur out of the order noted in the Figures. For example, two blocks shown in succession may, in fact, be executed substantially concurrently, or the blocks may sometimes be executed in the reverse order, depending upon the functionality involved. Some blocks may be deleted or other blocks may be added depending on the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method comprising:
maintaining, by at least one processor, a remembered set for a class set, the remembered set indicating whether instances of the class set are contained in one or more regions in memory, and in which regions in memory the instances are contained;
configuring the remembered set to transition between a plurality of possible representations in order to use memory efficiently, the possible representations comprising: (1) an "immediate" representation storing pointers to specific regions in memory where instances of the class set are contained; and (2) a "bit vector" representation comprising a bit for each region in memory that indicates whether at least one instance of the class set is contained in the corresponding region;
causing the remembered set to transition from the "immediate" representation to the "bit vector" representation when a number of regions that contain instances of the class set exceeds a specified number; and
using the remembered set to perform an incremental garbage collection process for a subset of the regions in memory.

2. The method of claim 1, wherein the class set is one of a set of classes associated with a class loader, a group of classes, and a single class.

3. The method of claim 1, wherein the possible representations further comprise an "overflow" representation that assumes that all regions in memory contain at least one instance of the class set.

4. The method of claim 1, wherein the possible representations further comprise an "empty" representation that indicates that no instances of the class set are contained in any of the regions in memory.

5. The method of claim 1, further comprising, prior to performing the incremental garbage collection process, resetting the bits in the "bit vector" representation for the regions in the subset.

6. The method of claim 5, further comprising, upon performing the incremental garbage collection process, setting the bits in the "bit vector" representation for those regions in the subset where instances of the class set are discovered.

7. The method of claim 6, further comprising identifying the class set as "live" in the event any of the bits of the "bit vector" representation are set.

8. The method of claim 1, further comprising, in the event the class set is determined not to be "live," unloading the class set.

9. A computer program product comprising a non-transitory computer-readable storage medium having computer-usable program code embodied therein, the computer-usable program code configured to perform the following when executed by at least one processor:
maintain a remembered set for a class set, the remembered set indicating whether instances of the class set are contained in one or more regions in memory, and in which regions in memory the instances are contained;
configure the remembered set to transition between a plurality of possible representations in order to use memory efficiently, the possible representations comprising: (1) an "immediate" representation storing pointers to specific regions in memory where instances of the class set are contained; and (2) a "bit vector" representation comprising a bit for each region in memory that indicates whether at least one instance of the class set is contained in the corresponding region;
cause the remembered set to transition from the "immediate" representation to the "bit vector" representation when a number of regions that contain instances of the class set exceeds a specified number; and
use the remembered set to perform an incremental garbage collection process for a subset of the regions in memory.

10. The computer program product of claim 9, wherein the class set is one of a set of classes associated with a class loader, a group of classes, and a single class.

11. The computer program product of claim 9, wherein the possible representations further comprise an "overflow" representation that assumes that all regions in memory contain at least one instance of the class set.

12. The computer program product of claim 9, wherein the possible representations further comprise an "empty" representation that indicates that no instances of the class set are contained in any of the regions in memory.

13. The computer program product of claim 9, wherein the computer-usable program code is further configured to, prior to performing the incremental garbage collection process, reset the bits in the "bit vector" representation for the regions in the subset.

14. The computer program product of claim 13, wherein the computer-usable program code is further configured to, upon performing the incremental garbage collection process, set the bits in the "bit vector" representation for those regions in the subset where instances of the class set are discovered.

15. The computer program product of claim 14, wherein the computer-usable program code is further configured to identify the class set as "live" in the event any of the bits of the "bit vector" representation are set.

16. The computer program product of claim 9, wherein the computer-usable program code is further configured to, in the event the class set is determined not to be "live," unload the class set.

17. An apparatus comprising:
    at least one processor;
    at least one memory device operatively coupled to the at least one processor and storing instructions for execution on the at least one processor, the instructions causing the at least one processor to:
      maintain a remembered set for a class set, the remembered set indicating whether instances of the class set are contained in one or more regions in memory, and in which regions in memory the instances are contained;
      configure the remembered set to transition between a plurality of possible representations in order to use memory efficiently, the possible representations comprising: (1) an "immediate" representation storing pointers to specific regions in memory where instances of the class set are contained; and (2) a "bit vector" representation comprising a bit for each region in memory that indicates whether at least one instance of the class set is contained in the corresponding region;
      cause the remembered set to transition from the "immediate" representation to the "bit vector" representation when a number of regions that contain instances of the class set exceeds a specified number; and
      use the remembered set to perform an incremental garbage collection process for a subset of the regions in memory.

18. The apparatus of claim 17, wherein the class set is one of a set of classes associated with a class loader, a group of classes, and a single class.

19. The apparatus of claim 17, wherein the possible representations further comprise an "overflow" representation that assumes that all regions in memory contain at least one instance of the class set.

20. The apparatus of claim 17, wherein the possible representations further comprise an "empty" representation that indicates that no instances of the class set are contained in any of the regions in memory.

* * * * *